Patented June 17, 1941

2,246,070

UNITED STATES PATENT OFFICE 2,246,070

MANUFACTURE OF BASIC SUBSTITUTED SHAPED MATERIALS

Paul Schlack, Berlin-Treptow, Germany, assignor, by mesne assignments, to Walther H. Duisberg, New York, N. Y.

No Drawing. Application August 4, 1936, Serial No. 94,197. In Germany August 8, 1935

2 Claims. (Cl. 8—113)

This invention relates to the manufacture of basic shaped materials.

One of its objects is to provide a process of producing textile materials, films and the like having pronounced basic character. Other objects are the new materials. Further objects will be apparent from the detailed specification following hereinafter.

It is known that compounds having reactive hydrogen which, as in ketones, phenols, and carboxylic acids, may be bound to the carbon or, as in acid amides, to the nitrogen, can react with formaldehyde or other aldehydes and amines, particularly secondary amines (that salts also may be reactive has been indicated by Mannich and Braun, Centralblatt 1920, vol III, page 922) or with condensation products from 1 mol or 2 mol amine and formaldehyde to form aminomethyl-compounds or substitution products thereof. It is also possible to substitute basically in similar manner resinous condensation products from phenols or carbonyl compounds, that is to say products of comparatively high molecular weight. However, hitherto such reactions have been realized only in homogeneous systems or with soluble or dissolved materials.

The present invention is based on the observation that it is possible to introduce amino-alkyl radicals into the molecule of shaped products of high molecular weight particularly textile materials which contain reactive hydrogen atoms linked to carbon or in amide groups, and thereby to increase considerably the basic character of such compounds or to bring about such basic character.

The present invention consists in causing the shaped article, for instance a textile or sheet material which must contain an easily replaceable hydrogen atom, such as is the case in phenolic, ketonic, and acid amide groupings, with a condensation product from formaldehyde or another carbonyl compound and an amine. Naturally the condensation of the constituents of the condensation product can be effected during the reaction.

Condensation products of this kind are dimethylaminomethanol, diethylaminomethanol, piperidomethanol, N.N'-hydroxymethylpiperazine, tetramethyl-methylenediamine, tetraethylmethylenediamine, methylene-bis-piperidine, methylene-bis-morpholine, the product of reaction of methylolurea with secondary amines such as dimethylamine, piperidine or morpholine, acetoxymethyldiethylamine, N-dimethylaminomethylamides of a fatty acid, such as formic acid, acetic acid, lactic acid, the product of the reaction of diethylaminomethylchloride with methylmercaptane, condensation products from β-ketonic acid esters or β-diketones with formaldehyde and dimethylamine.

Instead of condensation products of these types there may be used the following components:

Individual or mixed amines, particularly secondary amines and aldehydes or other reactive carbonyl compounds, also mixtures of amines, carbonyl compounds and amides or mixtures of amines and condensation products from acid amides and carbonyl compounds, for example methylolamides.

Particularly suitable components are secondary amines or their salts having a relatively low molecular weight, especially dimethylamine, diethylamine, pyrrolidine, piperidine, morpholine, thiomorpholine, piperazine. Bases of relatively high molecular weight, for example dibutylamine, or dicyclohexylamine react with greater difficulty and in some cases not at all or give more feeble effects unless the conditions of reaction are essentially sharpened, which, however, is not always possible in view of the danger of damaging the substratum.

Particularly suitable carbonyl compounds are formaldehyde or glyoxal. The carbonyl compounds may be used in the form of their bisulfite compounds, also other substances which yield carbonyl compounds in reactive form, for instance trioxymethylene, the already named methylol compounds of amides, for instance the methylol compounds of ordinary urea and thiourea, guanidine, cyanuric acid and others, may be used. The presence of substances furthering the formation of resin, particularly urea derivatives, may further increase the effect.

By working with raised pressure and at a high temperature the reaction may also occur with ketones or ketonic acid esters. As accelerators basic substances are effective, for instance, excess of secondary amine, tertiary amines, as well as feebly alkaline salts like borax, sodium phosphate and potassium carbonate. In many cases, particularly when the reacting material contains quaternary basic nitrogen, there may also be used acid condensing agents, for example sulfuric acid, toluenesulfonic acid, dimethylsulfate, boric acid or zinc chloride.

For reacting with the above substances or components, there come into question, for example, animal fibers such as natural silk, wool or other animal hair, tanned or untanned hides, artificial threads or foils of fibroin, artificial threads, sheets, ribbons or the like, which contain or consist exclusively of organic polyamides of high molecular weight such as polyacrylic acid amide, furthermore mixed polymerization products from acrylic acid amide or methacrylic acid amide and vinylalkylethers or acrylic acid esters, cellulose-xanthate fatty acid amides (including the polyamides which are derived from sulfur derivatives of carbonic acid having the groups

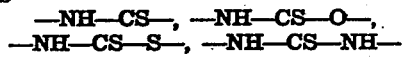

in open or cyclic form) or aromatic polyhydroxy-compounds of high molecular weight, for example those of the "Novolak" type (soluble non-hardened condensation products from phenols and formaldehyde produced by reacting the components in an acid medium. "Novolak" is a registered trade-mark), or other artificial materials having reactive hydrogen in their molecule. Particularly suitable are natural or artificial fibers, sheets or other shaped articles from or with substances which contain richly phenolic components, for instance tyrosine in the case of fibroin.

The invention may be put into practice in various ways. For example, the shaped body, for instance loaded or unloaded natural silk in the form of skeins or fabrics, may be treated at a high temperature with an aqueous solution of the material which is to react until the desired effect is attained. Also, materials may be printed or impregnated with a solution of the reacting material containing, if desired, a thickening agent and, if desired, after separating the excess of the reacting material or after an intervening drying, heating the material for a certain time, for instance 4–14 hours in an atmosphere of 60–90 per cent. relative moisture at a medium temperature, for example, between 40 and 80° C.

The action may be facilitated by an addition of a swelling agent, for instance, formamide in the case of protein substances or ethylalcohol in the case of the organic cellulose derivatives; the swelling agent may act on the substratum either in the liquid or in the vapor form.

In many cases it is advantageous to conduct the operation in a different sequence and at first to convert the reactive substratum into a methylol derivative by treatment with formaldehyde, whereupon the mass is brought into reaction with the amine. This may be done, for instance, by first allowing the formaldehyde to react in presence of an amine salt, if desired in the presence also of an excess of acid and then by subsequent addition of a base, for example an alkali hydroxide, to liberate the amine. In this case also an excess of aldehyde may be used, as in general the aminomethanol also reacts with the previously formed methylol compounds. In operating with previously made methylol compounds or by treating shaped articles made of mixtures containing previously made methylol compounds, primary amines are more generally applicable than when amines and aldehydes are used simultaneously.

The increase produced in this manner in the affinity for dyestuffs, dyestuff derivates and dyestuff components and other treating agents such as mordants, softeners, insecticides, matting agents having preponderatingly acid character or a negative charge is in most cases quite considerable.

The following examples illustrate the invention:

Example 1

Schappe silk in the form of skeins is saturated in the course of 20 minutes at room temperature with a solution of 10 per cent. strength of dimethylaminomethanol which contains 0.5 per cent. of trimethylamine, then centrifuged and transferred to a tightly closed vessel with as little loss of amine as possible. In this vessel the impregnated silk is kept at 50° C. in an atmosphere of 90 per cent. relative moisture for 8 hours. After washing, the silk has a high affinity for acid dyestuffs, for example 4 per cent. Orange II (Schultz Farbstofftabellen, 7th edition, vol. I, page 86, No. 189) in presence of 3 per cent. acetic acid is already completely adsorbed at 45° C. Untreated material, on the other hand, even after ½ hour dyeing at 95° C. is only insufficiently coloured.

The increase of the affinity of the natural silk produces essential advantages in dyeing and printing, and new effects are obtainable and the applicability of the various dyestuffs or classes of dyestuffs is considerably extended and generalized. This is true not only for ordinary acid dyestuffs but also for direct dyestuffs, indigosols, and others.

Example 2

Woolen yarn (zephyr) is caused to react with dimethylaminomethanol in the manner described in Example 1 for natural silk. The affinity for acid dyestuffs such as Orange II or Alizarine Direct Blue A (Schultz Farbstofftabellen, 7th ed., vol. II, page 9) is considerably increased, although comparatively not so strongly as is the case with natural silk. By after-treatment with apichlorhydrin, a further increase of affinity is produced.

Example 3

Artificial silk from silk fibroin is treated in a solution of 10 per cent. strength of dimethylaminomethanol which contains a small proportion of trimethylamine for 4 hours at 40° C. The increase of affinity is similar to that produced in silk as described in Example 1.

Example 4

Artificial thread from ethyl cellulose of a low degree of ethylation and soluble in a mixture of benzene and alcohol, which thread contains 10 per cent. of polyacrylic acid amide, is immersed in a closed vessel for 16 hours at 80° C. in a solution of 10 per cent. strength dimethylaminomethanol. The threads thus treated may be dyed intensely with many acid dyestuffs, for example Orange II, Alkali Fast Green 10G (Schultz Farbstofftabellen, 7th ed., vol. II, page 9), brilliant Indocyanine G (Schultz Farbstofftabellen, 7th ed., vol. II, page 39) (each 3 per cent.)

Example 5

For the polyacrylic acid amide used in Example 4 there may be substituted a phenolformaldehyde resin of the "Novolak" type made from 10 mol phenol and 5 mol formaldehyde. The treated fibres show in this case also a considerable affinity for acid dyestuffs.

Example 6

Films made from an acetyl cellulose having 54 per cent. of combined acetic acid and containing 10 per cent. of soluble unhardenable phenol formaldehyde resin of the "Novolak" type are treated for 18 hours at 80° C. with an aqueous solution of 10 per cent. strength containing in molecular proportions dimethylamine and formaldehyde. The films are then capable of being deeply dyed by Orange II.

A still stronger dyeing can be obtained if the solution of formaldehyde and dimethylamine contains these bodies in the proportion of 1 mol of the former and 2 mol of the latter. In this case more deeply seated saponifaction occurs, so that the film is no longer soluble in acetone after treatment. Such a saponification may in many cases be desirable. Comparative films of acetyl cellulose containing "Novolak" which are not treated and are treated without an addition of resin are only feebly dyed.

*Example 7*

A sateen of unloaded natural silk is heated in a vessel of 100 parts of volume calculated on one part by weight of silk, at a relative humidity of 75 per cent. in the atmosphere, one part with 10 per cent. and another part with 25 per cent. of tetramethyl-methylenediamine (boiling point 84° C. respectively) for eight hours at 60° C. The amine is evaporated and acts uniformly on the good to be treated. If the pieces thus aminated are dyed together with untreated silk by means of 4 per cent of Orange II in the presence of 1 per cent of glacial acetic acid at 75° C. the untreated silk assumes a very light shade whereas the material treated with 10 per cent of base and particularly the material which has been treated with 25 per cent of base is dyed an intense shade. The colorings thus obtained are relatively well fast to washing with water.

*Example 8*

A cuprammonium silk containing about 10 per cent of the amide from technical palmitic acid hydrated until the iodine number disappears is heated with an aqueous solution of tetramethyl-methylenediamine of 10 per cent strength at 50° C. until the development of dimethylamine slackens. The silk is now dyed an intense shade by means of acid dyes, for instance Aminonaphtol Red 6 B (Schultz Farbstofftabellen, 7th ed., vol. I, page 58, No. 110) in the presence of acetic acid. Coloring with dyes capable of being chromated, for instance with Anthracene Acid Brown KE (Schultz Farbstofftabellen, 7th ed., vol. II, page 187) can be improved as to fastness by after-chromation.

*Example 9*

Cellulose acetate artificial silk which contains 8 per cent of lauric acid amide is heated in toluene for such a period of time with an excess of tetramethyl-methylenediamine at 100° C. until the development of dimethylamine has ceased. The silk is strongly dyed with many acid dyes and the coloring is very fast to water.

*Example 10*

A sheet from 60 parts of casein, 36 parts of polymethacrylic acid amide and 4 parts of hexamethylenetetramine rendered insoluble in water by pressing in the warmth is immersed for 4 hours in an 8 per cent solution of dimethylaminomethanol at 40° C., then pressed again and finally dried at 40 to 60° C. The affinity to acid dyes of the product is considerably increased.

*Example 11*

An acetate artificial silk containing 7.5 per cent of the thiourea from technical triethylene-tetramine and methyl-mustard oil is immersed for three hours in a 15 per cent aqueous solution of dimethylaminomethanol at 40° C. The silk has a strong affinity to acid dyes. The concentration of the dimethylaminomethanol solution can be reduced if a salt, for instance, sodium nitrate is added to the treating solution.

*Example 12*

Natural silk is impregnated with a 15 per cent solution of the reaction product from 1 molecular proportion of antipyrin, 1 molecular proportion of formaldehyde and 1 molecular proportion of C-dimethylpiperidine, hydrochloride; the silk is dried at 50° C. over moist common salt in a vessel of 50 parts by volume calculated on the silk, then there are added 10 per cent of epichlorhydrine calculated on the weight of the silk and the silk is heated for 8 hours at 80° C.

*Example 13*

Natural silk is impregnated with a 2 per cent solution of triethanolamine, then pressed until the increase in weight amounts to 100 per cent and is kept in a room heated at 40° C. and containing 75 per cent of relative moisture until equilibrium is obtained. Then vapors of tetramethylmethylenediamine are sucked through the silk for 6 hours at 60° C. The amine is circulated and freed from dimethylamine which is liberated in the process in a washing tower containing fragments of clay soaked with dimethylaminomethanol. The affinity of the silk is considerably increased.

What I claim is:

1. A process of introducing nitrogen into the molecule of textile materials or foils, said materials containing an easily replaceable hydrogen atom and comprising a substance selected from the group consisting of protein substances, resinous polyamides, mixed polymerizates comprising polyamides, cellulose xanthate-fatty acid amides which process comprises impregnating said materials with a solution containing the product of reaction of a secondary amine and a compound selected from the group consisting of formaldehyde and condensation products which yield formaldehyde in reactive form, and heating the impregnated material for several hours in an atmophere of from about 60 to about 90 per cent of relative moisture at a temperature of from about 40 to about 80° C., thereby reacting said textile materials or foils with an aminomethanol compound formed by the reaction of said secondary amine and formaldehyde and replacing said hydrogen atom by an aminomethylene group.

2. A process of introducing nitrogen into the molecule of a textile material containing protein substances, which process comprises impregnating said material with a solution of 10 per cent strength of dimethylamino methanol, centrifuging said material and keeping said material in an atmosphere of 90 per cent relative moisture for eight hours at a temperature of from about 40° to about 80° C., thereby replacing a reactive hydrogen atom in said protein substance by a dimethylamino methylene group.

PAUL SCHLACK.